United States Patent [19]

Sekiguchi

[11] 4,327,936
[45] May 4, 1982

[54] AIR DEHUMIDIFYING ARRANGEMENT FOR PNEUMATIC VEHICLE SUSPENSION SYSTEM

[75] Inventor: Tomoyoshi Sekiguchi, Atsugi, Japan

[73] Assignee: Atsugi Motor Parts Co. Ltd, Kanagawa, Japan

[21] Appl. No.: 88,128

[22] Filed: Oct. 25, 1979

[30] Foreign Application Priority Data

Jan. 25, 1979 [JP] Japan .................................. 54-8395[U]

[51] Int. Cl.³ .............................................. B60G 17/04
[52] U.S. Cl. ................................ 280/711; 55/385 R; 55/387
[58] Field of Search ............... 280/702, 708, 703, 714, 280/736, 711, 707; 55/59, 167, 387, 302, 303, 385; 98/2.11, 2; 267/65

[56] References Cited

U.S. PATENT DOCUMENTS

| | | | |
|---|---|---|---|
| 2,779,162 | 1/1957 | Baker et al. ...................... | 98/2.11 X |
| 3,183,014 | 5/1965 | Doomernick ...................... | 280/711 X |
| 3,199,307 | 8/1965 | Willis ..................................... | 98/2.11 X |
| 3,653,676 | 4/1972 | Higginbotham ................. | 280/702 X |
| 3,784,720 | 1/1974 | Wanner ................................. | 280/711 |
| 3,827,218 | 8/1974 | Settlermyer ....................... | 55/387 X |
| 3,828,881 | 8/1974 | Over ................................. | 280/711 X |
| 3,881,743 | 5/1975 | Whelan ................................. | 280/711 |
| 3,917,307 | 11/1975 | Shoebridge ..................... | 280/702 X |
| 3,980,316 | 6/1976 | Yates ................................. | 280/711 X |
| 4,007,875 | 2/1977 | Stolz et al. ........................ | 55/387 X |

Primary Examiner—Robert R. Song
Attorney, Agent, or Firm—Lowe, King, Price & Becker

[57] ABSTRACT

A pneumatic self-levelling vehicle suspension system including an air compressor, an air reservoir communicating with the air compressor, an air dehumidifier unit intervening between the air compressor and reservoir, and a variable-length pneumatic suspension unit having an air inlet port communicable with the air reservoir across a two-position valve and an air discharge port through which an excess of air is to be discharged to the open air from the suspension unit, wherein arrangements are made so that the air discharge port of the suspension unit is made open to the atmosphere by way of the air dehumidifier unit for automatically regenerating the regenerative desiccative chemical composition contained in the air dehumidifier unit.

3 Claims, 2 Drawing Figures

AIR DEHUMIDIFYING ARRANGEMENT FOR PNEUMATIC VEHICLE SUSPENSION SYSTEM

FIELD OF THE INVENTION

The present invention relates to a pneumatic suspension system for a land vehicle such as an automotive vehicle and, particularly, to an air dehumidifying arrangement for dehumidifying compressed air for use in a pneumatic suspension system of a land vehicle. More particularly, the present invention relates to an arrangement for automatically regenerating the regenerative desiccative chemical composition contained in an air dehumidifier incorporated in a pneumatic suspension system for a land vehicle. A pneumatic suspension system herein referred to is a self-levelling suspension system using a pneumatically or hydro-pneumatically operated, variable-length suspension unit or strut.

BACKGROUND OF THE INVENTION

In a pneumatic self-levelling suspension system used for a land vehicle such as, typically, a large-sized bus, the moisture contained in the compressed air to be distributed from an air compressor to the pneumatic suspension units tends to deposit in the pipes and conduits leading from the air compressor to the individual suspension units. During cold seasons, the moisture thus deposited in the air feed network of a pneumatic suspension system freezes into ice in the pipes and conduits and sometimes makes the suspension system inoperable. To preclude this from occurring, it is important to remove the moisture deposit from the piping system from time to time but, for this purpose, experienced, time-consuming servicing of the pipes and conduits is indispensable. In order to dispense with such manual servicing, it has been proposed to install an automatic air dehumidifier unit between the air compressor and the suspension units of a pneumatic suspension system. The air dehumidifier unit has incorporated therein a body of regenerative desiccative chemical composition such as, for example, silica gel and is capable of automatically dehumidifying the compressed air passed therethrough. A problem has however been encountered in such a piping system because the desiccative chemical composition in the dehumidifier unit becomes inactive unless the dehumidifier unit is not serviced to regenerate the composition at certain regular intervals. The present invention contemplates elimination of such a problem encountered in a pneumatic self-levelling suspension system having incorporated therein an air dehumidifier unit using a regenerable desiccative chemical composition such as silica gel.

It is, accordingly, a prime object of the present invention to provide an arrangement for automatically regenerating the regenerative desiccative chemical composition in an air dehumidifier unit provided in the air feed network of a pneumatically or hydropneumatically operated, self-levelling suspension system for a land vehicle such as a large-sized bus.

SUMMARY OF THE INVENTION

In accordance with the present invention, there is provided a pneumatic suspension system for a land vehicle wherein arrangements are made so that a pneumatic, variable-length suspension unit having air inlet and discharge ports is supplied with compressed air from an air reservoir communicable with the air inlet port of the suspension unit and communicating with a source of compressed air through an air dehumidifier unit having incorporated therein a body of regenerative desiccative chemical composition for dehumidifying the compressed air passed therethrough, wherein the improvement comprises passageway means through which the air discharge port of the suspension unit is communicable with the open air through the air dehumidifier unit so that the desiccative chemical composition in the air dehumidifier unit can be automatically regenerated by the compressed air to be discharged through the passageway means.

In accordance with another outstanding aspect of the present invention, there is provided a pneumatic self-levelling suspension system for a land vehicle comprising a power-driven air compressor, an air reservoir operative to store therein air under pressure, switch means responsive to variation in the air pressure in the air reservoir and operative to actuate the air compressor in response to an air pressure lower than a predetermined value in the air reservoir, an air dehumidifier unit operatively intervening between the air compressor and the air reservoir and having incorporated therein a body of regenerative desiccative chemical composition for dehumidifying the air passed therethrough, a pneumatic variable-length suspension unit to mechanically intervene between a sprung mass part of a vehicle and an unsprung mass part of a vehicle for supporting the sprung mass part of the vehicle at a variable level over a road surface, the suspension unit having air inlet and discharge ports and a variable-volume air chamber intervening between the inlet and discharge ports, the level of the sprung part of the vehicle being variable with the volume of the air chamber, first two-position valve means operatively intervening between the air reservoir and the air inlet port of the suspension unit, passageway means for providing one-way communication from the air discharge port of the suspension unit to the open air through the air dehumidifier unit, and second two-position valve means provided in the passageway means.

BRIEF DESCRIPTION OF THE DRAWING

The features and advantages of a pneumatic suspension system proposed by the present invention will be more clearly appreciated from the following description taken in conjunction with the accompanying drawing, in which.

DESCRIPTION OF THE PREFERRED EMBODIMENT

Figure 1:
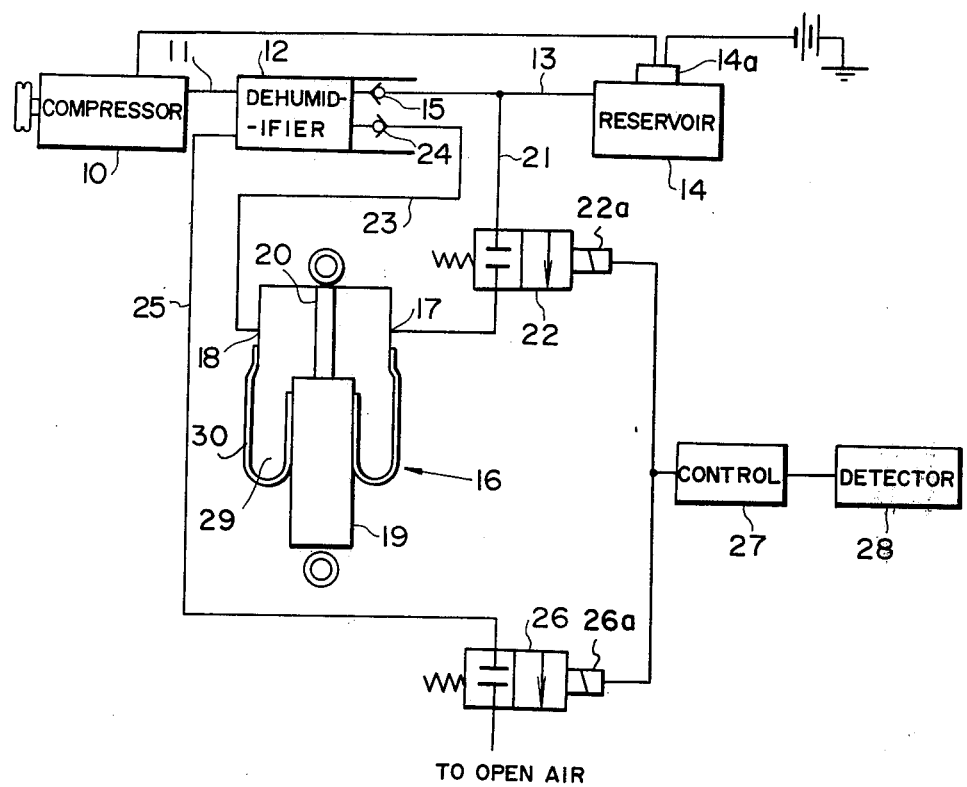
FIG. 1 is a schematic view showing a preferred embodiment of a pneumatic suspension system according to the present invention.

Referring to FIG. 1 of the drawing, a pneumatic self-levelling suspension system embodying the present invention is shown comprising a power-driven air compressor 10 which is to be driven by an internal combustion engine of a motor vehicle or an electric motor installed on a motor vehicle. The air compressor 10 has an air delivery port communicating through an air supply passageway 11 with an air dehumidifier unit 12 and is thus adapted to deliver compressed air to the air dehumidifer unit 12 by way of the passageway 11 when driven by an internal combustion engine or an electric motor. The air dehumidifer unit 12 has incorporated therein a body of regenerable desiccative composition (not shown) such as silica gel and is capable of dehumidifying the compressed air directed from the air compressor 10 to the dehumidifier unit 12. The air dehumidifier unit 12 has an air outlet port communicating through an air feed passageway 13 with an air reservoir 14 adapted to store therein air under pressure. The compressed air supplied from the air compressor 10 and dehumidified by the air dehumidifier unit 12 is thus passed through the air feed passageway 13 to the air reservoir 14 and is stored in the reservoir 14. The air feed passageway 13 is provided with a suitable one-way check valve 15 adapted to prevent passage of air backwardly from the air reservoir 14 to the air dehumidifier 12 through the air feed passageway 13. The air reservoir 14 is equipped with a suitable electric pressure-responsive switch unit 14a electrically intervening between a suitable power source and a suitable electric actuating element (not shown) provided in the air compressor 10. The pressure-responsive switch unit 14a is responsive to variation in the pressure of air in the air reservoir 14 and is adapted to remain open when the pressure of air in the air reservoir 14 is higher than a predetermined value. When the switch unit 14a is thus held open, the air compressor 10 is maintained inoperative so that the supply of compressed air from the air compressor 10 to the air reservoir 14 through the air dehumidifier unit 12 is interrupted. When the pressure of the compressed air stored in the air reservoir 14 is lower than the predetermined value, the pressure-responsive switch unit 14a is closed and actuates the air compressor 10 to deliver compressed air to the air dehumidifier unit 12 and through the air dehumidifier unit 12 to the air reservoir 14. The delivery of compressed air from the air compressor 10 to the air reservoir 14 is stopped by the action of the switch unit 14a when the pressure of air in the air reservoir 14 reaches the predetermined value. Thus, the pressure-responsive switch unit 14a is adapted to maintain the pressure of air in the reservoir 14 higher than a predetermined value throughout operation of the suspension system.

The pneumatic self-levelling suspension system embodying the present invention further comprises a pneumatically or hydropneumatically operated, variable-length suspension unit 16 having air inlet and discharge ports 17 and 18 and a variable-volume air chamber 29 which intervenes between the air inlet and discharge ports 17 and 18. The variable-volume air chamber 29 is formed in a pneumatic or hydropneumatic suspension unit 16 by a flexible diaphragm 30 whose lower end is sealed to cylinder 19 having a piston (not shown) movable with the flexible diaphragm 30 in response to variations in the pressure of air developed in the air chamber. The piston in the cylinder is connected to a rod 20 which in turn is operatively connected at its upper leading end together with the diaphragm to a sprung part of a vehicle (not shown). The cylinder 19 is operatively coupled at its lower end to a suitable unsprung mass part suspension mechanism of a vehicle suspension mechanism (not shown). The suspension unit 16 is thus lengthwise extendible and contractable between the sprung mass part of the vehicle and the unsprung mass part of the vehicle depending upon the volume of the air chamber in the diaphragm 30 so that the level of the sprung mass part of the vehicle is continuously variable with the volume of the air chamber, viz., the pressure of air developed in the air chamber.

The air inlet port 17 of the suspension unit 16 is communicable with the above mentioned air feed passageway 13 between the air dehumidifier unit 12 and the air reservoir 14 through an air distribution passageway 21 provided with a solenoid-operated first two-position valve 22. On the other hand, the air discharge port 18 of the suspension unit 16 communicates with the air dehumidifier unit 12 through an air return passageway 23 provided with a suitable one-way check valve 24 adapted to prevent passage of air backwardly from the air dehumidifier unit 12 to the discharge port 18 of the suspension unit 16 through the air return passageway 23. An air discharge passageway 25 leads from the air dehumidifier unit 12 and is open to the atmosphere across a solenoid-operated second two-position valve 26 as shown.

The first and second two-position valves 22 and 26 have respective solenoids 22a and 26a connected in parallel to a suitable level control circuit 27 having an input terminal connected to a suitable vehicle level detector 28. The vehicle level detector 28 is responsive to variation in the height of the sprung mass part over a road surface and is operative to produce an output signal in response to a vehicle level higher or lower than a predetermined value. In response to the signal thus delivered from the vehicle level detector 28, the level control circuit 27 supplies a control signal to the first two-position valve 22 or the second two-position valve 26 and actuates either of the first and second two-position valves 22 and 26 depending upon the signal produced by the vehicle level detector 28. Each of the first and second two-position valves 22 and 26 is herein assumed, by way of example, to remain open in the absence of a control signal supplied to the solenoid thereof and to close when the solenoid thereof is energized by the control signal from the level control circuit 27.

The level of a sprung mass part of the vehicle over a road surface changes temporarily when, for example, the vehicle is loaded with additional passengers or baggages or the passengers or baggages are unloaded from the vehicle. When the height of the sprung mass part over a road surface is thus detected by the level detector 28 to be less than a predetermined value, the level control circuit 27 supplies a control signal to the first two-position valve 22 and causes the valve 22 to open. The compressed air stored in the air reservoir 14 is fed through the valve 22 to the variable-volume air chamber in the flexible diaphragm forming part of the suspension unit 16 and causes the suspension unit 16 to extend and lift the vehicle body until the vehicle body structure is raised to the predetermined level over the road surface. When the sprung mass part is raised to the predetermined level over the road surface, the level control circuit 27 ceases delivery of the control signal to the first two-position valve 22 and causes the valve 22 to close, interrupting the supply of compressed air to the suspension unit 16 from the air reservoir 14.

If, on the other hand, the level of the sprung mass part over a road surface is detected by the level detector 28 to be higher than the predetermined value, the level control circuit 27 supplies a control signal to the second two-position valve 26 and causes the valve 26 to open. The compressed air which has been accumulated in the air chamber 29 of the suspension unit 16 is now discharged at a limited rate to the open air through the air return passageway 23, one-way check valve 24, air dehumidifier unit 12, air discharge passageway 25 and second two-position valve 26. As the compressed air is thus discharged from the suspension unit 16, the variable-volume diaphragm 30 in the suspension unit 16 is contracted longitudinally and allows the sprung mass part to lower toward the predetermined level over the road surface. When the sprung mass part reaches the predetermined level over the road surface, the level control circuit 27 ceases delivery of the control signal to the second two-position valve 26 and causes the valve 26 to close, thereby interrupting the discharge of air from the suspension unit 16. During discharge of air from the suspension unit 16, the stream of the compressed air admitted into the air dehumidifier unit 12 is passed through the body of the regenerative desiccative composition in the dehumidifier unit 12 and thus regenerates the desiccative composition automatically.

Figure 2:
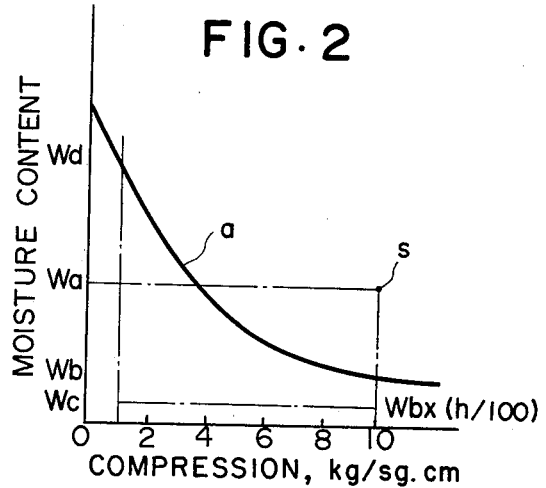
FIG. 2 is a graph showing a vapor saturation characteristic of air in terms of the pressure to which vapor-containing air is compressed.

As is well known in the art, adiabatic compression of saturated water vapor having a predetermined volume at an atmospheric pressure causes gradual reduction in the moisture content of the compressed air as indicated by curve a in FIG. 2. If thus, a unit volume of air containing wa grams of moisture at an atmospheric pressure is compressed under the pressure of 10 kgs/sq.cm, the compressed air will be supersaturated to point S indicated in FIG. 2. If the vapor-containing air thus compressed is passed through the air dehumidifier unit 12, the dehumidified air leaving the dehumidifer unit 12 will contain Wb×(h/100) grams of moisture when the hygroscopic ability of the desiccative composition incorporated in the air dehumidifer unit 12 is assumed to be h percent. During discharge of air through the dehumidifier unit 12, however, the pressure of air in the air dehumidifier unit 12 open to the atmosphere through the second two-position valve 26 is reduced to a certain level which is close to the atmospheric pressure. If, thus, the pressure of air developed in the air dehumidifier unit 12 during discharge of air therethrough is assumed to be 1 kg/sq.cm by way of example (although such a pressure is actually lower than the particular level), the compressed air admitted into the air dehumidifier unit 12 has the humidity of (Wc/Wd)×100 percent, where Wc represents Wb×(h/100) and Wd is the moisture content in grams of supersaturated water vapor under the compressive pressure of 1 kg/sq.cm. This means that the discharge air to be passed through the air dehumidifier unit 12 is capable of removing Wd−Wc grams of moisture from the regenerative desiccative composition in the air dehumidifier unit 12.

The compressed air containing Wa grams of moisture when supplied from the air compressor 10 to the air dehumidifier unit 12 is, thus, capable of removing about Wd grams of moisture when passed through the air dehumidifier unit 12 during discharge of air from the suspension unit 16. The regenerative desiccative composition incorporated in the air dehumidifier unit 12 is for this reason at all times maintained in a sufficiently dry state because the air to be passed through the dehumidifier unit 12 during discharge of air therethrough is capable of removing more moisture from the regenerative desiccative composition than the moisture which the desiccative composition is capable of collecting moisture from the compressed air supplied from the air compressor 10.

From the foregoing description it will have been appreciated that the present invention provides the following advantages over prior-art dehumidifying arrangements for automotive pneumatic suspension systems:

(1) The discharge air from the suspension unit 16 being passed through the air dehumidifier unit 12, the regenerative desiccative chemical composition provided in the dehumidifier unit 12 can be automatically regenerated during discharge of air from the suspension unit 16.

(2) For this reason, the quantity of the regenerative desiccative chemical composition to be incorporated into the dehumidifier unit 12 can be significantly reduced as compared to the quantities of such a composition in prior-art dehumidifying arrangements for pneumatic vehicle suspension systems.

(3) Since the suspension system is of the type using an air reservoir 14 provided between the air dehumidifier unit 12 and the suspension unit 16, a small-sized, light-duty compressor can be used as the air compressor 10.

(4) Where a small-sized, light-duty air compressor is used, the air dehumidifier unit 12 may also be of small-sized construction commensurate with the delivery rate of the air compressor and the velocity of air stream in the air dehumidifier unit 12.

(5) Simplicity of construction and low production cost.

(6) Since the air dehumidifier unit 12 can be reactivated in an automatic fashion, the dehumidifier unit need not be serviced periodically and will thus add to the commercial value of the pneumatic suspension system using the air dehumidifier unit.

What is claimed is:

1. A pneumatic self-levelling suspension system for a land vehicle, comprising:
  (a) a power driven air compressor;
  (b) an air reservoir operable to store therein compressed air;
  (c) an air dehumidifier unit interconnecting the air compressor and air reservoir, said air dehumidifier unit including a regenerative desiccative chemical composition for dehumidifying compressed air received from the air compressor;
  (d) a pneumatic variable-length suspension unit interconnecting a sprung mass part of the vehicle and an unsprung mass part of the vehicle for supporting the sprung mass part at a variable level in relation to a road surface, said suspension unit having air inlet and discharge ports communicating with a variable volume air chamber, the level of the sprung mass part being variable with the volume of the air chamber;
  (e) first two position valve means interconnecting the air reservoir to the air inlet port of the suspension unit;
  (f) passageway means interconnecting the air discharge port of the suspension unit to the air dehumidifier unit for discharging the dehumidified compressed air through the air dehumidifier unit to the ambient air, said discharged compressed air tending to have lower humidity than the compressed air entering the air dehumidifier unit, thereby regenerating said regenerative desiccative chemical composition by removing and discharging moisture from the composition to the ambient air;
  (g) second two position valve means provided in the passageway means; and
  (h) electronic control means for opening the first two position valve means when the level of the sprung mass part is lower than a predetermined level in relation to the road surface, said electronic control means being operable to allow compressed air to enter the suspension unit and simultaneously close the second two position valve means to prevent discharge of compressed air from the suspension unit, thereby raising the level of the sprung mass part to a predetermined level in relation to the road surface, said electronic control means being further capable of closing the first two position valve means when the level of the sprung mass part is higher than the predetermined level and open the second two position valve means for lowering the level of the sprung mass part to said predetermined level.

2. A suspension system according to claim 1, further comprising switch means responsive to air pressure variations in the air reservoir, said switch means being operable to actuate the air compressor upon detection of an air pressure in the air reservoir less than a predetermined value.

3. A pneumatic self levelling suspension for a land vehicle having a pneumatic variable length suspension unit interconnecting a sprung mass part of the vehicle and an unsprung mass part of the vehicle for supporting the sprung mass part at a variable level in relation to a road surface, said suspension unit having air inlet and discharge ports communicating with a variable volume air chamber, the level of the sprung mass part being variable in relation to the volume of air in the air chamber, comprising:

(a) a power driven air compressor;
(b) an air reservoir operable to store therein compressed air;
(c) an air dehumidifier unit interconnecting the air compressor and air reservoir, said air dehumidifier unit including regenerative desiccative chemical composition for dehumidifying compressed air received from the air compressor; and
(d) passageway means interconnecting the air discharge port of the suspension unit to the air dehumidifier unit for discharging dehumidified compressed air through said air dehumidifier to the ambient air, said dehumidified compressed air being discharged through the regenerative desiccative chemical composition tending to have lower relative humidity than the compressed air entering the air dehumidifier from the air compressor, thereby being operable to remove a substantial quantity of moisture from the desiccative chemical composition for ventilation to the ambient air and regeneration of said chemical composition due to the relative humidity differential between entering compressed air and discharged compressed air.

* * * * *